Sept. 16, 1952 G. K. GRAHAM 2,611,038

SOUND RECORDER WITH SOUND-CONTROLLED STYLUS FEED

Filed April 30, 1946 2 SHEETS—SHEET 1

INVENTOR.
George K. Graham

BY [signature]

ATTORNEY

SOUND RECORDER WITH SOUND-CONTROLLED STYLUS FEED

Filed April 30, 1946 2 SHEETS—SHEET 2

INVENTOR.
George K. Graham
BY C. D. Tuska
ATTORNEY

Patented Sept. 16, 1952 2,611,038

UNITED STATES PATENT OFFICE 2,611,038

SOUND RECORDER WITH SOUND-CONTROLLED STYLUS FEED

George K. Graham, Oceanside, N. Y., assignor to Radio Corporation of America, a corporation of Delaware Application April 30, 1946, Serial No. 665,924

8 Claims. (Cl. 179—100.4)

My invention relates to sound recording and particularly to a system for controlling the feed of a recording head whose stylus is used to cut sound grooves in a phonograph record or equivalent.

In avoidance of cutting of a groove which crosses over or into a previously cut groove, or which leaves an inter-groove wall so thin that mistracking is likely to occur after the record, or a copy of it, has been played a few times, the recording or cutting head is so mounted with respect to the record that substantially instantaneously upon, or in anticipation of, high amplitude of virbation of its stylus, the cutting head may be immediately advanced with respect to its feed by the lead screw normally effecting its movement.

Further in accordance with my invention, the setting of a speed-changing device interposed between the lead screw and its driving source is automatically changed by fixed steps, or progressively, in response to, or in anticipation of, change in volume level of a program being recorded. Preferably, because of the time lag involved in changing the speed of the lead screw, the cutter head is, as above described, advanced substantially instantaneously relative to the lead screw when high amplitude of vibration of the stylus occurs is is about to occur.

Further in accordance with my invention, control of substantially immediate advance of the cutting head or change in speed of the lead screw, or both, is effected by a relay system including a rectifier, such as a biased diode, for example, which derives a control voltage from the amplified output of the microphone, pickup head, or equivalent translating device.

More particularly in accordance with my invention, when either or both of these controls is to be effected in anticipation of high amplitude of stylus movement, the relay rectifier system is energized through a channel which at least in part is independent of the one between the translating device and the cutting head; when a single translating device is used, as in an original recording, the channel to the cutting head includes an electrical or acoustic delay line which is not included in the channel to the rectifier relay system; when, as in re-recording, two pickup devices may be used, the leading one is connected to the relay rectifier system and the trailing one to the cutter head.

My invention further resides in features of combination and arrangement hereinafter described and claimed.

Figure 1:
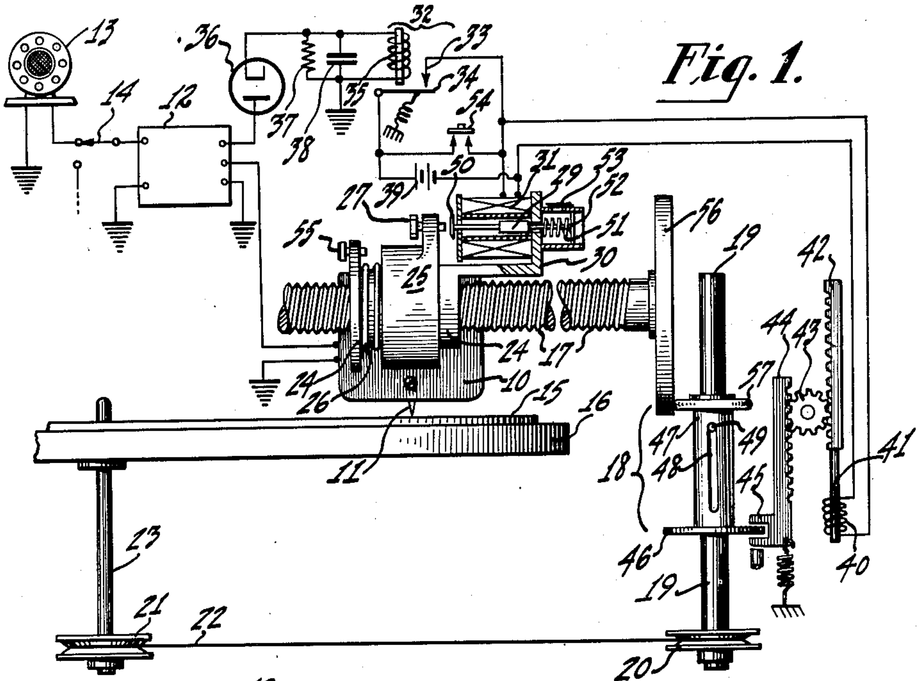
Figure 2:
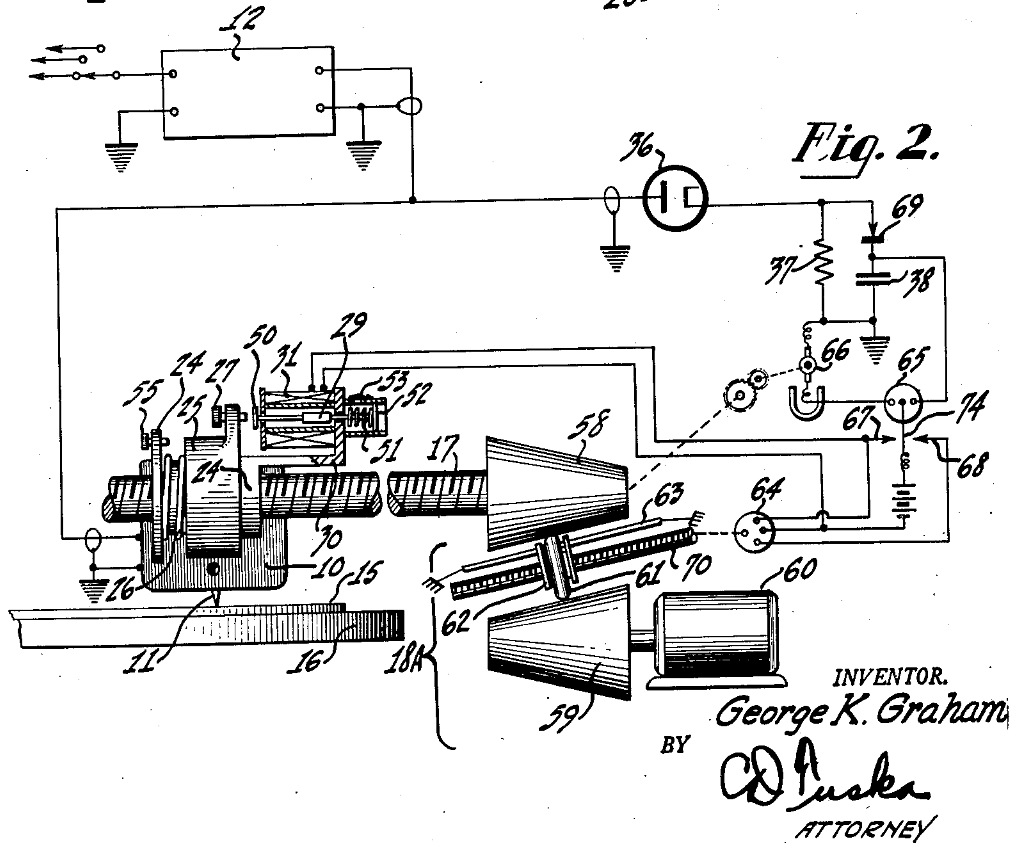
Figure 3:
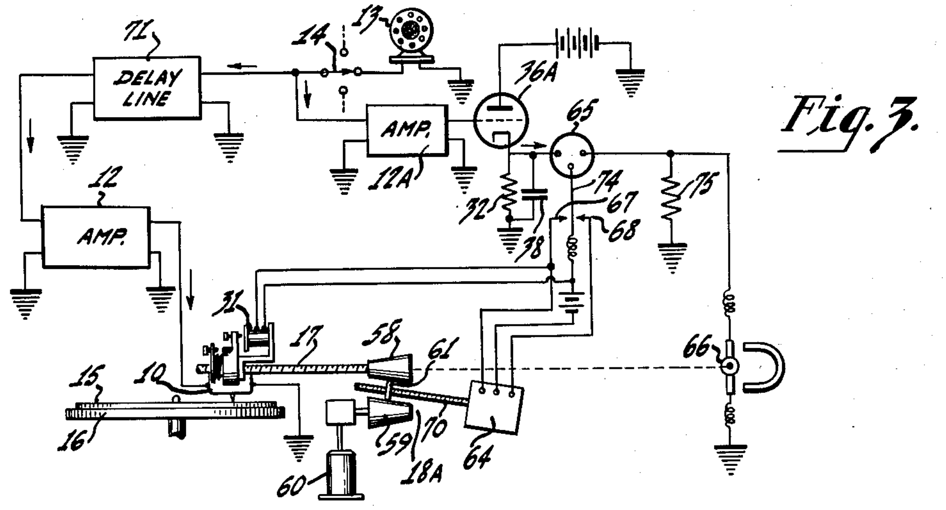
Figure 4:
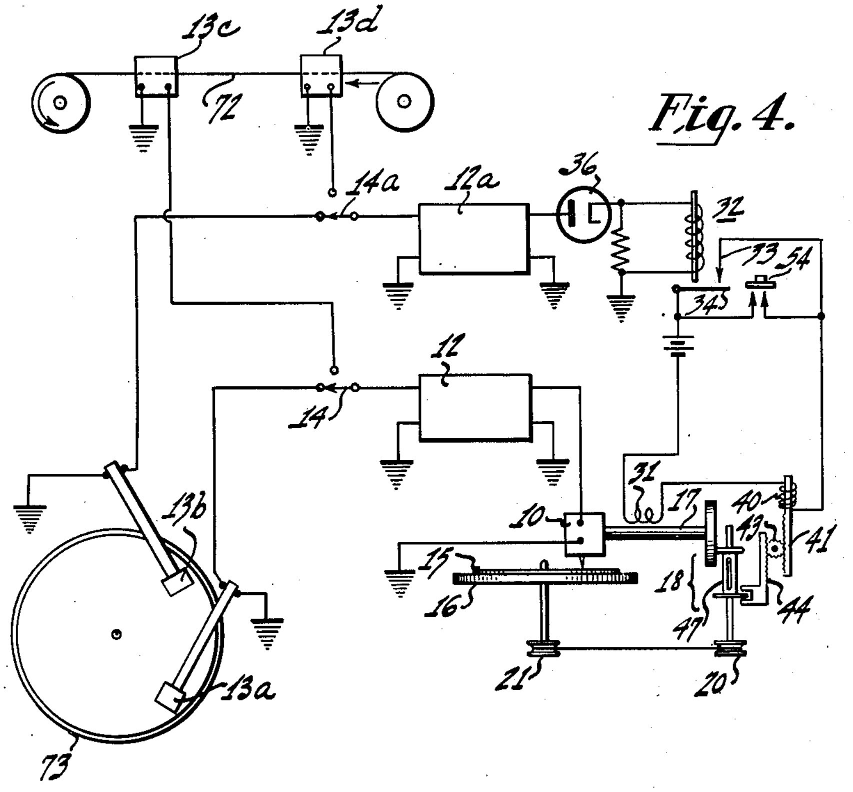

For a more detailed understanding of my invention and for illustration of several embodiments thereof, reference is made to the accompanying drawings, in which:

Fig. 1 diagrammatically illustrates one form of control system and associated parts of a recording mechanism;

Fig. 2 diagrammatically illustrates a modification of the system of Fig. 1 which provides for smoothly continuous speed control;

Fig. 3 diagrammatically illustrates another form of the invention which provides for an anticipatory control action during original recording operation; and Fig. 4 illustrates another modification of the control system which provides for anticipatory control action in re-recording systems.

Referring to Fig. 1, the recording head 10 may be of any conventional type provided, for example, with a cutting stylus 11 vibrated in accordance with the output of an amplifier 12 in whose input system is included a microphone 13 or equivalent device which derives from original sound vibrations, or some reproduction thereof, the electrical input of the amplifier 12, the latter having suitable gain to actuate the electromagnetic or other driving means for the stylus 11.

The stylus 11 cuts a spiral sound track in a record disc 15 mounted upon a turn-table 16, or equivalent, which is rotated at constant speed by any suitable means (not shown). The cutting head is fed transversely or radially over the record by a lead screw 17, driven through the speed-changing device 18 from any source of constant speed. In the particular arrangement shown, the input shaft 19 of the speed-change device is coupled by pulleys 20, 21, and belt 22 to the spindle 23 of the record-supporting disc 16.

For long playing time of the record, it is desirable that the feed of the screw 17 be slow so that the spiral cut by the stylus on the record will have a large number of closely spaced grooves. However, for faithful recording of the range of volume of the program, it is desirable to permit large range of amplitude of the stylus 11 and, in consequence, the spacing between adjacent grooves must be sufficiently great to avoid cutting of one groove into another or leaving an inter-wall groove so thin that a breakthrough will occur after the record is played a few times. If the spacing of the grooves is great enough to avoid this possibility, the playing time of the record is greatly and unnecessarily curtailed.

To obtain large range in amplitude of reproduction without undue curtailment of the playing time, the feed screw of Figure 1 is arranged to rotate at suitably slow speed so long as the level of signal input to the cutting head 10 is below a magnitude likely to result in mistracking, and to rotate at substantially higher speed (for example, twice the low speed) when the signal level is high enough possibly to cause mistracking. Specifically, the signal level is monitored by a rectifier relay system including a rectifier 36, such as a diode whose direct current output is of magnitude corresponding with the amplitude of the signal input to the cutting head 10. The rectified current traverses the coil 35 of a relay 32 whose contacts 33 and 34 are in circuit with a suitable source of current 39 and the coil 40 of an arrangement suited to effect change in the setting of the speed-changing device 18.

In the particular form of speed-changing device 18 shown in Fig. 1, a driving wheel 57 rotates with the shaft 19 but is free to slide axially thereof toward and away from the axis of rotation of a driven disc 56 mounted on or connected to the feed screw 17. Specifically, the wheel 57 is attached to a sleeve 47 having a slot 48 therein through or into which projects a pin 49 fastened to and rotating with the shaft 19. A disc 46, rotating with the sleeve 47, loosely fits into the recess of the extension 45 of a rack 44 which is mounted for a sliding movement parallel to the axis of the shaft 19. The rack 44 is connected through a pinion 43, which is mounted on a stationary axis, to a rack 42 connected to or forming an extension of the core member 41 of the solenoid coil 40. In the particular arrangement shown, the core 41 is biased by gravity or by a spring to the position corresponding with the low speed position of the driving wheel 57.

When the signal level to the cutting head is above a level safe for low rate of feed of the cutting head, the current passed by the rectifier 36 to the relay coil 35 is sufficient to effect closure of the relay contacts 33, 34, whereupon the solenoid 40 is energized to pull down its core 41 and, through the rack and pinion mechanism above described, to raise the sleeve 47 to the high-speed position. So long as the signal level remains high, the solenoid 40 remains energized to hold the drive wheel 57 nearer the axis of rotation of disc 56 and so there is maintained a high rate of feed of the cutting head by the lead screw 17. When the signal level falls to a low value for which there is no possibility of mistracking, the output current of rectifier 36 is insufficient to hold the relay contacts 33, 34, closed, whereupon the coil 40 is deenergized and the sleeve 47 is returned to the low-speed setting. It is thus insured that the playing time of the record is conserved when there is no danger of mistracking.

Due to the time required for the screw 17 actually to attain its higher speed after energization of solenoid 40, there is the possibility of mistracking if there is an abrupt change in signal level. To avoid this, provision is made to substantially instantaneously advance the cutting head upon occurrence of high amplitude signals independently of the feed by the lead screw 17. In the preferred arrangement shown for accomplishing that end, the cutting head 10 is mounted upon a slide 25 which is free to move, axially of the screw 17, with respect to the carriage 24 upon which it is mounted. The carriage 24 threadably engages the lead screw 17 and therefore is advanced at a rate fixed by the rotation of screw 17 but the slide 25 and cutter 10 may be advanced with respect to the carriage 24 in response to occurrence of high signal level and so substantially instantaneously widen the spacing between the groove being cut and the preceding groove without waiting for the speed of the screw actually to increase.

The movement of the cutter head 10 independently of the screw 17 may be effected by the core 29 of a solenoid 31 which is energized concurrently with the solenoid 40 of the speed-change mechanism. Upon energization of the solenoid 31 which is carried by a bracket 30 of the carriage 24, the core 29 is moved to the left (as viewed in Figure 1) to move the slide 25 axially of the lead screw 17 to a position determined by an adjustable stop 55 suitably mounted upon the carriage 24. Upon termination of the high level signals, the solenoid 31 is deenergized by the opening of relay contacts 33 and 34, whereupon the solenoid core 29 is returned to its low level position by a biasing spring 51. The cutting head 10 is concurrently moved to the right by the biasing spring 26 to a position determined by engagement of an adjustable stop 27 on the slide 25 with a stop 50 which may, as shown, be fastened to a rod extending from core 29. It is desirable that the return of the cutter head to the low level position be retarded to avoid cutting of a groove which intercepts the high amplitude groove already cut. To that end, the return movement of the solenoid core 29 may be retarded by any suitable means, such as by a dashpot including the piston 52 secured to the core 29 and having a valve member 53 which substantially closes when a spring 51 in engagement with the piston 52 forces the piston to the right.

The solenoid arrangement described above for actuation of the cutter head may be replaced by any equivalent one such, for example, as a pneumatic or hydraulic device having a solenoid-operated valve under the control of the relay 32. There may be also provided a push button 54 in shunt with the relay contacts 33 and 34 for manual operation by a program engineer who follows the score or equivalent and may, in anticipation of expected high signal level, effect actuation of solenoids 31 and 41 to increase the speed of the lead screw 17 and to advance the cutter 10 with respect to its feed by the lead screw.

In the modification shown in Fig. 2, the speed-change device 18A between the lead screw 17 and its constant speed driving motor 60 is of a type which provides for a smoothly continuous change in speed. Specifically, it includes a driven cone 58 coupled or secured to the lead screw 17 and a driving cone 59 coupled to motor 60. An idler 61 for transmission of power between the cones is rotatably mounted upon a carriage 62 prevented from rotation by a guide 63 and threadedly engaging a feed screw 70 driven by a reversible motor 64. By a control arrangement hereinafter described, the motor 64 is from time to time energized to effect rotation of the screw 70 in one direction or the other to change the position of the idler wheel 61 with respect to the peripheries of the cones 58 and 59 and so effect change in the speed of the lead screw 17 and, therefore, the rate at which the cutting head is advanced. The motor 64 may be controlled by a contact galvanometer 65, or equivalent, responsive to unbalance of two voltages, one produced by a generator 66 connected with the galvanometer 65 and driven at a speed proportional to the rate of rotation of screw 17, and the other derived from the resistor-capacity network 37, 38 in circuit with the rectifier 36. The latter voltage, by virtue of the action of the rectifier 36 and its bias produced by the resistor-capacity network 37, 38, is substantially proportional to the amplitude of the signals fed to the cutter head.

So long as there obtains a desired correspondence between the amplitude of the signals and the speed of feed of the cutter head, the voltage of a generator 66 and the voltage across the condenser 38 are substantially in balance and the relay or galvanometer 65 effects no control of the motor 64. Assuming, however, that there is an increase in the signal level, the voltage across the condenser 38 increases and the relay contact 67 is engaged by the movable contact 74 of the relay 65 to energize the motor 64 to run in a direction necessary to shift the idler 61 to a higher speed setting. When the speed of the feed screw 17 attains the proper value for the changed level, the resulting increased voltage of the generator 66 balances the higher condenser voltage and the motor 64 is deenergized by separation of relay contacts 67 and 74. In addition, each time the relay contacts 67 and 74 are engaged to increase the speed of the lead screw 17, the solenoid 31 is energized to effect, as described in connection with Fig. 1, a substantially instantaneous advance movement of the cutter head 10 with respect to the lead screw. When the contacts 67 and 74 separate, it is desirable, for reasons above discussed, to delay the return of the cutter head to the lower speed position. This may be effected, as in the system of Fig. 1, by a dashpot associated with the solenoid core 29 or with slide 25.

When the amplitude of the signal to the cutter head decreases and it is desirable to decrease the speed of the lead screw 17 for conservation of playing time, the voltage across the condenser 38 derived by the rectifier 36 from the signals correspondingly falls and no longer balances the higher voltage then being produced by the generator 66. In consequence, the movable contact 74 of the relay 65, or equivalent, moves into engagement with a contact 68 to energize the motor 64 for rotation in a direction to reduce the speed setting of the idler wheel 61. This rotation continues until the reduced speed of the lead screw 17, as reflected by a correspondingly reduced voltage of generator 66, falls to such a value that the movable contact 74 of relay 65 returns to its neutral position and so effects deenergization of the motor 64.

As it is desirable to delay the change in speed of the feed screw in going to a lower speed, there may be included in the resistor-condenser network a rectifier 69 of the metal-oxide type, for example, which permits flow of current in both directions but whose inverse resistance is much higher than its forward resistance. By this provision, it is insured that the condenser 38 is quickly charged to a higher value upon increase of signal voltage applied to rectifier 36 but falls more slowly to a lower voltage when the signal level falls. Otherwise stated, the discharge path of the condenser 38 through the inverse resistance of the rectifier 69 and the resistance 37 is of much higher value than the path through which the condenser is charged.

If desired, the contacts 67 and 74 of the relay 65 may be in parallel to the contacts of a push button 54, as in the system of Fig. 1, to permit a program engineer to effect an anticipatory control of the position and speed of advance of the cutter head when a rapid and large change in signal amplitude is to be expected.

In the system shown in Fig. 3, such anticipatory control may be automatically effected. The signal channel from the pickup device 13, or equivalent, to the cutter head 10 includes a delay line 71, either electrical or acoustic in character, which appreciably lengthens the time required for the signal to travel from the pickup device to the cutter head. The channel from the translating device 13 to the rectifier 36*a* and including an amplifier 12*a*, however, does not include a delay line and, in consequence, the relay or equivalent responsive device in the output circuit of the rectifier may act to change the setting of the speed changer 18*a* and to change the position of the cutter head by the solenoid 31, or equivalent, before the change in amplitude of the signal appears at the cutter head.

In the particular arrangement shown in Fig. 3, the rectifier output voltage appearing across the condenser 38 is opposed to the voltage across a resistor 75 in circuit with the generator 66 which is driven at speed corresponding to that of the lead screw 17. Accordingly, upon increase or decrease in amplitude of the signal supply to the rectifier, the relay or galvanometer 65 deflects in one sense or the other to effect, through the motor 64 and the idler wheel 61, a corresponding change in the setting of the speed-changing device 18*a*. Concurrently with energization of the motor 64 to increase the speed of the lead screw, the solenoid 31 is energized to effect substantially instantaneously advance of the cutter head, all as previously described in discussion of Figs. 1 and 2.

When the record 15 is not being cut from the original program, but from a previously made record on a record disc, wire, film, or the like, it is not necessary to use a delay line. The desired anticipatory control action may be attained by using a second pickup device which suitably leads the one used for energization of the cutter head and by feeding the signal of such leading pickup to the rectifier 36 for control purposes. More specifically, as shown in Fig. 4, the pickup 13*b* is connected through an amplifier 12*a* to the rectifier 36 in a signal channel which is independent of the channel which includes the pickup device 13*a*, the amplifier 12, and the cutter head 10.

With respect to the sound groove previously cut in the control record 73, the pickup 13*b* is in advance of the pickup 13*a* so that, before high amplitude signals are transmitted to the cutter head, those same signals act through the rectifier 36 and the relay 32 to advance the cutter head 10 and to increase the speed of the lead screw. The particular arrangement for performing these functions may be any of those previously described or their equivalent; specifically, in Fig. 4 it is the same as that shown in Fig. 1.

Similarly, when the source of signals is a film, a tape, or a wire, there are employed two pickup heads 13*c* and 13*d*. The direction of feed of the wire or film 72 is such that the pickup 13*d* is the first to respond and since this, the leading pickup, is associated with the rectifier relay system, the cutter head has already been advanced and the change in setting of the speed-changing device 18 has already been effected before those same signals, as affecting the second pickup 13*c*, are transmitted to the cutter head 10.

Further description appears unnecessary in view of the full explanation above of the other elements of the system, all of which have been identified by similar reference characters in previous figures.

The movable contacts of the switches 14 and 14a, Fig. 4, may be ganged for movement in unison to select either the pickups 13a and 13b for re-recording from a disc record or the pickups 13c and 13d when the re-recording is to be from a film or wire record.

It shall be understood that my invention is not limited to the particular arrangements shown but that changes and modifications may be made all, however, within the spirit of my invention.

What is claimed is:

1. In a recording system, a recording head, a lead screw for feeding said head, and means responsive to high amplitude of vibrations to be recorded by said head for increasing the speed of rotation of said screw and for advancing said head with respect to its feed by said screw.

2. In a recording system, a recording head, a carriage on which said head is slidably mounted, a feed screw for said carriage, and means responsive to high amplitude of vibrations to be recorded by said head slidably to advance it on said carriage.

3. In a recording system, a recording head, a lead screw for smoothly continuously feeding said head, a motor, a speed-changing device between said motor and said lead screw, and a relay system including a rectifier responsive to occurrence of high amplitude of vibrations to be recorded by said head to change the setting of said device for higher rate of advance of said screw and means responsive to said relay system for immediately advancing said head with respect to its feed by said screw.

4. In a recording system, a recording head, a carriage on which said head is slidably mounted, a lead screw engaging said carriage to effect smoothly continuous feed of the head, a motor, a speed-changing device between said motor and said lead screw, and means responsive to change in amplitude of vibrations to be recorded by said head for changing the setting of said device and for effecting movement of said head with respect to said carriage.

5. In a recording system, a recording head, a carriage on which said head is slidably mounted, a feed screw engaging said carriage to effect advance of the head, and mens for controlling movement of said head with respect to said carriage including a relay system having a rectifier whose direct current output is a function of the amplitude of vibrations to be recorded by said head.

6. In a recording system, a recording head, a lead screw for feeding said head radially of a record disc, means for changing the speed of rotation of said screw to accommodate different levels of recording, and means for moving said head radially of the record independently of its feed by said lead screw in accommodation of rapid rise in level of recording.

7. In a recording system, a recording head having a stylus for cutting grooves in a record, a lead screw for feeding said head over the record, and means responsive to high amplitude of vibrations to be recorded by said head effective substantially instantaneously to shift the head with respect to its feed by said screw to increase the spacing between the high amplitude groove and the previously cut groove and to increase the speed of said screw to maintain increased spacing between subsequently cut grooves so long as the high amplitude of the vibrations continues.

8. In a recording system, the combination as defined by claim 4, wherein means for effecting movement of the recording head with respect to the carriage includes a slide connected with the recording head and movable with respect to the carriage, a spring and a stop device for resisting and limiting respectively the movement of said slide with respect to the carriage, and a dash pot controlled solenoid for imparting movement to said slide.

GEORGE K. GRAHAM.

REFERENCES CITED

The following references are of record in the file of this patent:

UNITED STATES PATENTS

| Number | Name | Date |
|---|---|---|
| 1,860,104 | Larsen | May 24, 1932 |
| 1,958,634 | Mitchell | May 15, 1934 |
| 2,112,699 | Kleber | Mar. 29, 1938 |
| 2,239,042 | Kleber | Apr. 22, 1941 |
| 2,326,564 | Rigby | Aug. 10, 1943 |
| 2,369,085 | Stone | Feb. 6, 1945 |
| 2,391,897 | Harrington | Jan. 1, 1946 |
| 2,410,835 | Montague | Nov. 12, 1946 |

FOREIGN PATENTS

| Number | Country | Date |
|---|---|---|
| 321,153 | Great Britain | Oct. 21, 1929 |